(No Model.)

J. H. E. DE CELLES.
OCULIST'S TESTING FRAME.

No. 528,716. Patented Nov. 6, 1894.

Witnesses
Chas. F. Schwelz
Katie Farrell

Inventor
Joseph H. E. De Celles,
By Attorney
John C. Dewey

THE NORRIS PETERS CO., PHOTO-LITHO., WASHINGTON, D. C.

UNITED STATES PATENT OFFICE.

JOSEPH H. E. DE CELLES, OF SOUTHBRIDGE, MASSACHUSETTS, ASSIGNOR TO THE AMERICAN OPTICAL COMPANY, OF SAME PLACE.

OCULIST'S TESTING-FRAME.

SPECIFICATION forming part of Letters Patent No. 528,716, dated November 6, 1894.

Application filed January 3, 1894. Serial No. 495,512. (No model.)

*To all whom it may concern:*

Be it known that I, JOSEPH H. E. DE CELLES, a citizen of the United States, residing at Southbridge, in the county of Worcester and State of Massachusetts, have invented certain new and useful Improvements in Oculists' Testing-Frames; and I do hereby declare that the following is a full, clear, and exact description thereof, which, in connection with the drawings making a part of this specification, will enable others skilled in the art to which my invention belongs to make and use the same.

My invention relates to testing or trial frames, used by oculists and opticians in testing the eyes, to fit them with proper eyeglasses or spectacles, and the object of my invention is to improve upon the construction of said testing frames.

Heretofore in testing frames, as ordinarily made, the temples have been attached to the ends of the main or connecting bar of the frame, which has been made in one piece, or rigid, so that there is no adjustment of the temples to vary the width between them, and they will always be the same distance apart, and may be too wide, or too narrow for the face of the wearer.

In testing frames in which the temples have been made adjustable, to vary the width between them, they have always been attached to the lens holding frames, and the opening of the temples, to clasp the head of the user, caused friction in the revolving device of said frames, so that the same could not be readily turned, to adjust the lenses.

In my improvements the lens holding frames and the temples are both attached to the main bar of the frame, which is made in two parts, adjustable on each other, so that the temples, as well as the lens holding frames, will be adjusted, and the adjustment of both will be done simultaneously, and my invention consists in certain novel features of construction of an oculist's testing frame, and more particularly in making the main or connecting bar of the frame an extension bar, consisting of two bars adapted to slide longitudinally on each other, to lengthen or shorten the frame, and in attaching both the lens holding frames and the temples to said two bars, so that said frames and temples will move with said bars, and the distance between the temples be adjusted, and both the pupil and temple distance be registered, as will be hereinafter described.

Figure 1:
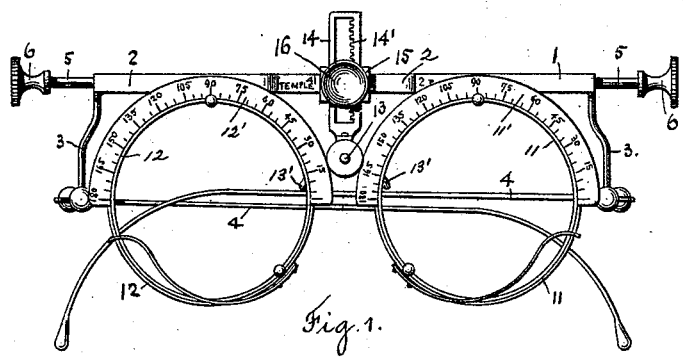
Figure 2:
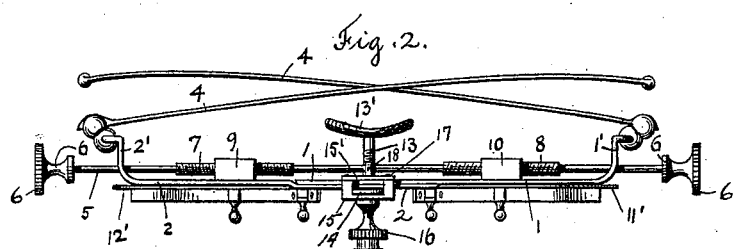
Figures 3, 4, 5:
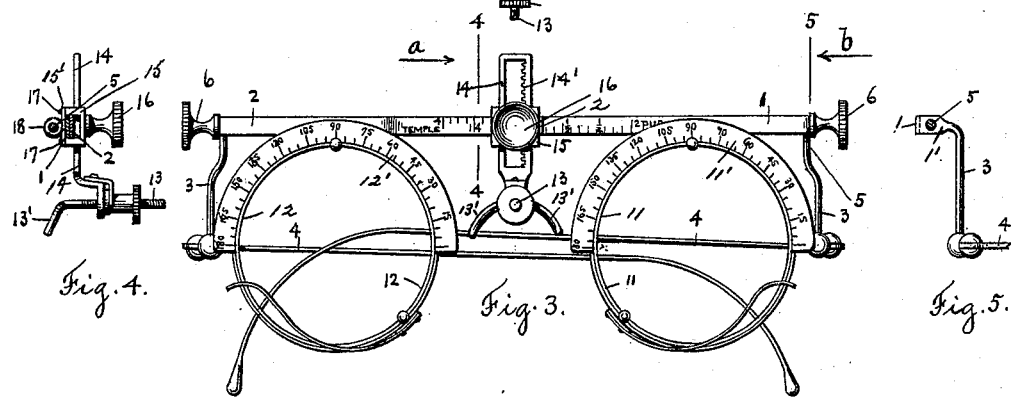
Figure 6:
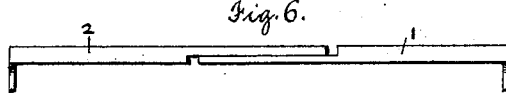
Figure 7:
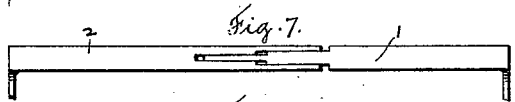
Figure 8:
Figure 9:
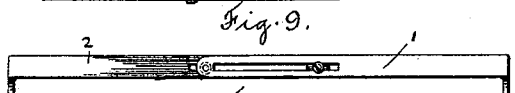
Figure 10:
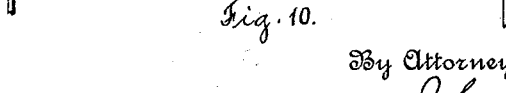

Referring to the drawings:—Figure 1 is a front view of an oculist's testing frame, embodying my improvements, with the lens holding frames, and temples moved toward each other. Fig. 2 is a plan view of the frame shown in Fig. 1. Fig. 3 corresponds to Fig. 1, but shows the lens holding frames, and the temples moved away from each other, and also the pupil, and the temple distance. Fig. 4 is a sectional detail, on line 4, 4, Fig. 3, looking in the direction of arrow $a$, same figure, showing the manner of constructing and combining the adjustable nose piece with the two sliding bars. Fig. 5 is a sectional detail, on line 5, 5, Fig. 3, looking in the direction of arrow $b$, same figure, showing the shape and construction of the outer end of one of the sliding bars, with the inner end of the temple jointed thereto. Figs. 6 to 10 inclusive, show modified constructions of the two sliding bars, detached, and adapted to slide longitudinally on each other, to lengthen or shorten the frame.

In the accompanying drawings, 1 and 2 are two flat bars, overlapping each other at their inner ends, and adapted to move on each other longitudinally, and form a connecting or extension bar or support for the other parts of the testing frame. The outer ends of the bars 1 and 2 preferably extend rearwardly and then downwardly, as shown in Fig. 5, and in the lower ends of the downwardly extending arms 3, are jointed the inner ends of the temples or bows 4 in the ordinary way. A rod 5 extends loosely at each end through the rearwardly projecting portions 1' and 2', of the bars 1 and 2, and said rod 5 is provided with a knob 6 on each end for turning the same, and also with a right-hand thread 7, and left-hand thread 8, for moving toward or away from each other the two nuts 9 and 10, mounted, one on the threaded portion 7, and the other on the threaded portion 8 of the rod 5, and provided with right and left-hand threads, in the ordinary way. One nut, 9, is rigidly secured, by solder or otherwise, to the back of one bar, as 1, and the other nut, 10, to the back of the other bar, as 2.

One lens holding frame, 11, is secured to the front of one bar, as 1, by solder or otherwise, at a point in front of one of the nuts on the rod 5, and the other lens holding frame 12, is secured to the front of the other bar, as 2, at a point in front of the other nut on the rod 5.

The lens holding frames 11 and 12 may be of the ordinary construction of revolving lens holders, adapted to hold and turn the different lenses, in testing the eyes, and are provided with the flat portions or segments 11' and 12', which are graduated, or marked in the usual way, as shown in Figs. 1 and 3.

The adjustable nose piece may be of any well known construction, and consists in this instance, of the rod 13 forked at its inner end 13', and adapted to be adjusted in a horizontal plane, and the bar 14, supporting the rod 13 at its lower end, and supported at its upper end, and having a bearing in the block 15, and adapted to be moved up or down in a vertical plane, by a pinion, not shown, located in the block 15 on the spindle of the knob 16, and operated by said knob 16, and engaging a rack 14' on said bar 14.

The block 15 is loosely supported on the inner ends of the bars 1 and 2, and holds said ends together, and overlapping each other, as shown in Figs. 2 and 4. Said bars are retained in said block by a thin plate 15', preferably secured on the back side of the block 15 by screws 17. One of the bars, in this instance the bar 2, is offset, as shown in Fig. 2, so that the main portions of both bars 1 and 2 will be in the same vertical plane, and the two lens holding frames 11 and 12 will be in the same vertical plane. See Fig. 2.

In order to hold the block 15, mounted loosely on the overlapping ends of the bars 1 and 2, and supporting the adjustable nose piece, in its proper position, and prevent its moving, a flange or collar 18, fast on the rod 5, extends into a slot or groove made in the plate 15' on the back of the block 15.

One of the sliding bars, as 1, is provided with a scale to give the pupil distance, and one end of the block 15 acts as a marker to register the distance between the pupils, and the other bar, as 2, is provided with a scale to give the temple distance, and the other end of the block 15 acts as a marker to register the distance between the temples.

From the above description in connection with the drawings, the operation of my improved testing frame will be readily understood by those skilled in the art.

When it is desired to adjust the lens holding frames, and the temples, the rod 5 is turned in one direction, or in the other, and the turning of said rod will cause the lens holding frames and the temples to be simultaneously moved toward, or away from each other, to adjust said frames and temples, and the pupil distance, and the temple distance will be registered, by means of the scale on the front of the two bars 1 and 2, forming the connecting or extension bar of the frame.

The advantages of my improved testing frame, will be readily appreciated by those skilled in the art. It is of simple construction and operation, and adapted to adjust the distance of the temples, to vary the width thereof, and to ascertain both the pupil and the temple distance, and to register the same simultaneously.

I have shown in Figs. 6 to 10 inclusive, a modified construction of the two bars 1 and 2 forming the extension bar of the frame, showing different ways in which the bars 1 and 2 may be constructed at their inner ends, to form the extension bar.

It will be understood that the details of construction of some of the parts of my testing frame may be varied somewhat from what is shown and described if desired.

Having thus described my invention, what I claim as new, and desire to secure by Letters Patent, is—

1. An oculist's testing frame, consisting of two flat bars with their outer ends bent rearwardly and downwardly to form downwardly extending arms to the lower ends of which are jointed the temples, and said temples, and the inner ends of said bars overlapping and adapted to slide longitudinally on each other to lengthen or shorten the frame, and a lens holding frame attached to each bar to move therewith, to adjust simultaneously the lens holding frames and the temples, substantially as set forth.

2. An oculist's testing frame, consisting of two flat bars with their outer ends bent rearwardly and downwardly to form downwardly extending arms to the lower ends of which are jointed the temples, and said temples, and the inner ends of said bars overlapping and adapted to slide longitudinally on each other to lengthen or shorten the frame, and a lens holding frame attached to each bar to move therewith, in combination with means for adjusting said bars, consisting of a screw threaded adjusting rod loosely supported in the rearwardly projecting portion of said bars, and a nut secured to the rear of each bar and mounted upon and having a threaded engagement with said bar, substantially as shown and described.

3. In an oculist's testing frame, an extension bar, consisting of two bars overlapping and adapted to slide longitudinally on each other at their inner ends, to lengthen or shorten the frame, and each bar having a lens holding frame, and a temple attached thereto, to move simultaneously therewith, substantially as shown and described.

4. In an oculist's testing frame, the combination with two bars, on which are supported the lens holding frames, the adjustable nose piece, and the temples, said bars adapted to slide on each other longitudinally, and connected at their inner ends by a block loosely mounted on said bars, and supporting the adjustable nose piece, of means for sliding or moving said bars longitudinally, consisting of a rod provided with a flange or collar for engaging said block, loosely mounted on said bar to prevent any movement thereof, and also provided with a right and left-hand thread, to engage a right-hand threaded nut and a left-hand threaded nut, secured, one to each bar, substantially as shown and described.

JOSEPH H. E. DE CELLES.

Witnesses:
GEO. W. WELLS,
CHANNING M. WELLS.